(12) United States Patent
Ostiguy et al.

(10) Patent No.: US 9,058,268 B1
(45) Date of Patent: Jun. 16, 2015

(54) APPARATUS, SYSTEM AND METHOD FOR MEMORY MANAGEMENT

(71) Applicant: Matrox Electronics System, Ltd., Dorval (CA)

(72) Inventors: Jean-Jacques Ostiguy, Montréal (CA); Amir Tadros, Laval (CA)

(73) Assignee: Matrox Graphics Inc., Dorval (CA)

( * ) Notice: Subject to any disclaimer, the term of this patent is extended or adjusted under 35 U.S.C. 154(b) by 338 days.

(21) Appl. No.: 13/623,865

(22) Filed: Sep. 20, 2012

(51) Int. Cl.
G06F 12/00 (2006.01)
G06F 9/26 (2006.01)
G06F 9/34 (2006.01)
G06F 12/08 (2006.01)

(52) U.S. Cl.
CPC ...... *G06F 12/0802* (2013.01); *G06F 2212/652* (2013.01)

(58) Field of Classification Search
CPC .............. G06F 12/0802; G06F 2212/652
USPC .................................. 711/20–208
See application file for complete search history.

(56) References Cited

U.S. PATENT DOCUMENTS

| 5,446,854 | A | 8/1995 | Khalidi et al. |
| 5,475,827 | A | 12/1995 | Lee et al. |
| 5,784,707 | A | 7/1998 | Khalidi et al. |
| 6,012,132 | A | 1/2000 | Yamada et al. |
| 6,061,773 | A | 5/2000 | Harvey et al. |
| 6,112,285 | A | 8/2000 | Ganapathy et al. |
| 6,308,247 | B1 | 10/2001 | Ackerman et al. |
| 6,378,059 | B1 | 4/2002 | Miyoshi |
| 6,393,544 | B1 | 5/2002 | Bryg et al. |
| 6,715,057 | B1 | 3/2004 | Kessler et al. |
| 7,003,647 | B2 | 2/2006 | Jacobs et al. |
| 7,284,112 | B2 * | 10/2007 | Bradford et al. ............... 711/206 |
| 7,447,869 | B2 | 11/2008 | Kruger et al. |
| 7,516,297 | B2 | 4/2009 | Mather |
| 7,673,304 | B2 | 3/2010 | Gosalia et al. |
| 7,779,214 | B2 | 8/2010 | Stecher |
| 7,783,859 | B2 | 8/2010 | Stecher |
| 7,793,070 | B2 | 9/2010 | Stecher |
| 7,809,921 | B2 | 10/2010 | Davis |
| 7,917,725 | B2 | 3/2011 | Stecher |
| 8,024,546 | B2 | 9/2011 | Foltz et al. |
| 8,195,917 | B2 | 6/2012 | Hohmuth et al. |

(Continued)

FOREIGN PATENT DOCUMENTS

WO    2000045267    8/2000

OTHER PUBLICATIONS

55:035 Computer Architecture and Organization Lecture Notes (Subset),"55035-060426-prn.pdf", retrieved Jul. 2012, http://user.engineering.uiowa.edu/~carch/lectures06/55035-060426-prn.pdf.

(Continued)

*Primary Examiner* — Ryan Bertram
(74) *Attorney, Agent, or Firm* — Rhodes Donahoe, LLC

(57) ABSTRACT

A method of memory management using a page table is provided where the method supports memory pages having a plurality of page sizes including a first page size and a second page size, where the second page size is a multiple (N) of the first page size. If the page table does not include an entry for a memory page of the first page size, the method includes reducing a size of the page table by eliminating at least one of a plurality of sections of the page table.

16 Claims, 8 Drawing Sheets

(56) References Cited

U.S. PATENT DOCUMENTS

| | | | |
|---|---|---|---|
| 8,719,503 B2* | 5/2014 | Koob et al. | 711/118 |
| 2002/0169936 A1 | 11/2002 | Murphy | |
| 2006/0253682 A1 | 11/2006 | Armstrong et al. | |
| 2009/0019253 A1* | 1/2009 | Stecher et al. | 711/207 |
| 2009/0172344 A1 | 7/2009 | Grochowski et al. | |
| 2009/0182976 A1 | 7/2009 | Agesen | |
| 2010/0011187 A1 | 1/2010 | Schoinas et al. | |
| 2011/0125983 A1 | 5/2011 | Stecher | |
| 2011/0138149 A1 | 6/2011 | Karlsson et al. | |
| 2011/0225389 A1 | 9/2011 | Grisenthwaite | |
| 2012/0060012 A1 | 3/2012 | Olszewski et al. | |
| 2012/0185667 A1* | 7/2012 | Gandhi | 711/203 |
| 2014/0156968 A1* | 6/2014 | Terry et al. | 711/207 |

OTHER PUBLICATIONS

Winwood et al., "Multiple Page Size Support in the Linux Kernal," Ottawa Linux Symposium 2002, Jun. 2002.

* cited by examiner

Figure 8A

Virtual address (40 bits) [39:0] — bits 39 through 0

Figure 8B

- 840B: Page directory field (17 bits) [39:23]
- 850B: Page table field (11 bits) [22:12]; Page offset field (12 bits) [11:0]
- 860B: Page directory field (17 bits) [39:23]; Page table field (10 bits) [22:13]; Page offset field (13 bits) [12:0]
- Page directory field (17 bits) [39:23]; Page offset field (23 bits) [22:0]

P = 1   N = 2   First page size = 4 Kbytes   Second page size = 8 Kbytes

Figure 8C

- 840C: Page directory field (16 bits) [39:24]; Page table field (12 bits) [23:12]; Page offset field (12 bits) [11:0]
- 850C: Page directory field (16 bits) [39:24]; Page table field (10 bits) [23:14]; Page offset field (14 bits) [13:0]
- 860C: Page directory field (16 bits) [39:24]; Page offset field (24 bits) [23:0]

P = 2   N = 4   First page size = 4 Kbytes   Second page size = 16 Kbytes

Figure 8D

- 840D: Page directory field (15 bits) [39:25]; Page table field (13 bits) [24:12]; Page offset field (12 bits) [11:0]
- 850D: Page directory field (15 bits) [39:25]; Page table field (10 bits) [24:15]; Page offset field (15 bits) [14:0]
- 860D: Page directory field (15 bits) [39:25]; Page offset field (25 bits) [24:0]

P = 3   N = 8   First page size = 4 Kbytes   Second page size = 32 Kbytes

Figure 8E

- 840E: Page directory field (15 bits) [39:25]; Page table field (13 bits) [24:12]; Page offset field (12 bits) [11:0]
- 850E: Page directory field (15 bits) [39:25]; Page table field (9 bits) [24:16]; Page offset field (16 bits) [15:0]
- 860E: Page directory field (15 bits) [39:25]; Page offset field (25 bits) [24:0]

P = 4   N = 16   First page size = 4 Kbytes   Second page size = 64 Kbytes

APPARATUS, SYSTEM AND METHOD FOR MEMORY MANAGEMENT

BACKGROUND OF INVENTION

1. Field of Invention

Embodiments of the invention generally relate to memory management in computing systems. More specifically, at least one embodiment relates to apparatus, systems and methods for memory management to support memory pages that have a plurality of page sizes.

2. Discussion of Related Art

Accessing memory (for example, to write data to or read data from memory) requires accurate identification of the locations within the physical memory. Because today's processing systems rely on multitasking to run many applications at the same time, memory management schemes employ virtual memory. The virtual memory is an address space created by the processing system for one or more tasks. The processing system then correlates locations in virtual memory to the corresponding locations in the associated physical memory of the system, for example, address locations in RAM. This translation (or mapping) occurs whenever data is read from or written to the physical memory. Because address translation is so widely used in processing operations, approaches have been implemented in an effort to make the preceding as efficient as possible.

A technique referred to as "paging" is often employed where a virtual memory is used to access the pages of the physical memory. According to this approach, a virtual address identifies a specific location in the physical memory. A page table is employed to map the virtual address to addresses in the physical memory. For example, the virtual address can include at least an identification of the correct page table and location in the page table that includes the physical address of a page of physical memory. The process of identifying the correct entry in the page table is sometimes referred to as "indexing." Each of the entries in the page table is associated with an offset field that includes a specific location (for example, a byte) within the page of physical memory.

The page table structure for a given application is established based on the size of the pages of the physical memory. Often the physical memory includes more than one page size. However, the page table structure for a given virtual memory address format is fixed. As a result, for a physical memory that includes more than one page size, the page table structure is established based on the smallest size of a page in the physical memory.

According to this approach, a single entry in the virtual memory is sufficient to map a given location of a small page in the physical memory and all addresses within the small page. However, it is necessary to use multiple entries in a page table to map all of the virtual addresses required for the larger page sizes of the physical memory because of their increased size. The result is that duplicate entries appear in the page table for each of the large pages, respectively, where these duplicate entries are each associated with different offsets.

Referring now to FIG. 1, an approach 100 is illustrated in which a single page size is used in a page table 102 of virtual memory to support a physical memory that includes two page sizes; a small page size 106 and a large page size 108. The virtual addresses 110, 114 for both small pages and large pages include a virtual page number field (111, 115) and an offset field (112, 116). For the small page size, the virtual page number field 111 alone provides a page entry field 118 used to identify an entry 104 in the page table. The offset field 112 for the small page size need only identify a location of the associated page of physical memory. Thus, a single page entry in the page table is employed for all locations for a given small page.

The size of the virtual address for small and large pages is the same and the page entry field is also the same size for both page sizes. However, the offset field for large pages is larger than the offset field for small pages because there are more address locations (for, example, bytes) in the large pages. Thus, the page entry field 120 for large pages requires information in the virtual page number field 115 and information in the offset field 116. In the illustrated example, the most significant bit(s) 117 of the offset field are included as the least significant bit(s) in the page entry field 120. That is, the page entry field directly extends from the virtual page number field 115 into the offset field 116. The preceding approach results in each of the multiple entries which are required for a large page being located consecutively in the page table because adjacent addresses differ by a single least significant bit.

The multiple entries for the larger page size in the page table provide duplication that is only necessary where two page sizes are used because the duplicate entries for a given page refer to the same address in the physical memory. Often, different page sizes are only needed for some processing while during other operations the page table 102 is employed with only a single page size. However, prior approaches do not organize page table entries in a manner that easily allows consolidation of the page table entries with the removal of duplicate entries. In FIG. 1, for example, where the page table includes entries for multiple large pages, the entries for the various large page sizes are distributed throughout the page table and the entries for the same large page are clustered together. In practice, this combination of an inconsistent distribution of entries for large pages and clustering for the same page is inefficient because it does not allow for an easy reduction in the size of the page table where for example all the entries are for large pages. The manner in which entries in the page table are indexed contributes to the problems with prior approaches.

A translation lookaside buffer (TLB) is employed to improve the speed at which a virtual address is mapped to an address in the physical memory of the processing system. In general, the TLB is a cache that stores the translation of an address in virtual memory to a corresponding address in the physical memory. Typically, the TLB includes translations for those addresses that are used most frequently and/or most recently. The use of the TLB increases the speed at which commands are executed because a memory operation can proceed without a search of the page table where the address translation is identified in the TLB.

SUMMARY OF INVENTION

It would be advantageous to provide a page table organization that both works with multiple page sizes and allows for consolidation during processing operations where the page table is only employed with a single page size. The preceding would be particularly effective at freeing memory otherwise allocated for the page table such that the memory is available for other applications and/or uses. In addition, it would be advantageous to improve efficiency of a TLB configuration process.

According to one aspect, where a page table is employed to support memory pages having a plurality of page sizes, it is advantageous to manipulate the manner in which the entries in the page table are indexed. For example, in some embodiments, bits from the page offset field of the virtual address our employed to index entries in the page table by including the bits in the page table field and reordering the bits relative to the original locations in the virtual address. According to some embodiments, the preceding creates a known distribution of the duplicate entries for large pages in the page table. In some embodiments, the known distribution eliminates the clustering of the duplicate entries in the page table. According to a further embodiment, the page table is sectionalized to further organize entries in the page table. In various embodiments the preceding facilitates the elimination of duplicate entries for large pages and a substantial reduction in a size of the page table.

According to one aspect, a method of memory management is provided where the method supports memory pages having a plurality of page sizes including a first page size and a second page size, where the second page size is a multiple (N) of the first page size. In some embodiments, the method includes providing a page table divided into a plurality of (N) sections, where the plurality of (N) sections are equally sized with each of the sections including an equal quantity of a plurality of locations identifiable relative to a starting location of the respective section. Further, for a page having the first page size, a single entry is provided in the page table, and the single entry includes a starting address of the page having the first page size; and for a page having the second page size, a plurality of entries is provided in the page table, where the plurality of entries includes an entry at the same location in each of the sections, and each of the plurality of entries includes a starting address of the page having the second page size. According to these embodiments, if the page table does not include an entry for a page of the first page size, the method includes reducing a size of the page table by eliminating at least one of the sections.

According to another aspect, a memory management system includes a physical memory referenced using at least one page having a first page size and at least one page at a second page size, where the second page size is a multiple (N) of the first page size, and a memory management unit configured to identify locations in the physical memory by translating virtual memory addresses to physical memory addresses using a page table. In some embodiments the memory management unit is configured to divide the page table into a plurality of (N) sections. In some embodiments, the memory management unit is further configured to, for pages having the first page size, provide a single entry in the page table where the single entry includes a starting address of the page having the first page size. In further embodiments, the memory management unit is also configured to, for a page having the second page size, provide plurality of entries in the page table, where the plurality of entries includes an entry at the same location in each of the sections, where each of the plurality of entries includes a starting address of the page having the second page size. According to the preceding embodiments, the memory management unit can also be configured to reduce the size of the page table by eliminating at least one of the sections if the page table does not include an entry for the page having the first page size.

As used herein, the letter N refers to an integer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8A illustrates a virtual address in accordance with one embodiment; and

FIGS. 8B, 8C, 8D and 8E illustrate virtual address formats for different parameter values in accordance with one embodiment.

DETAILED DESCRIPTION

Figure 1:
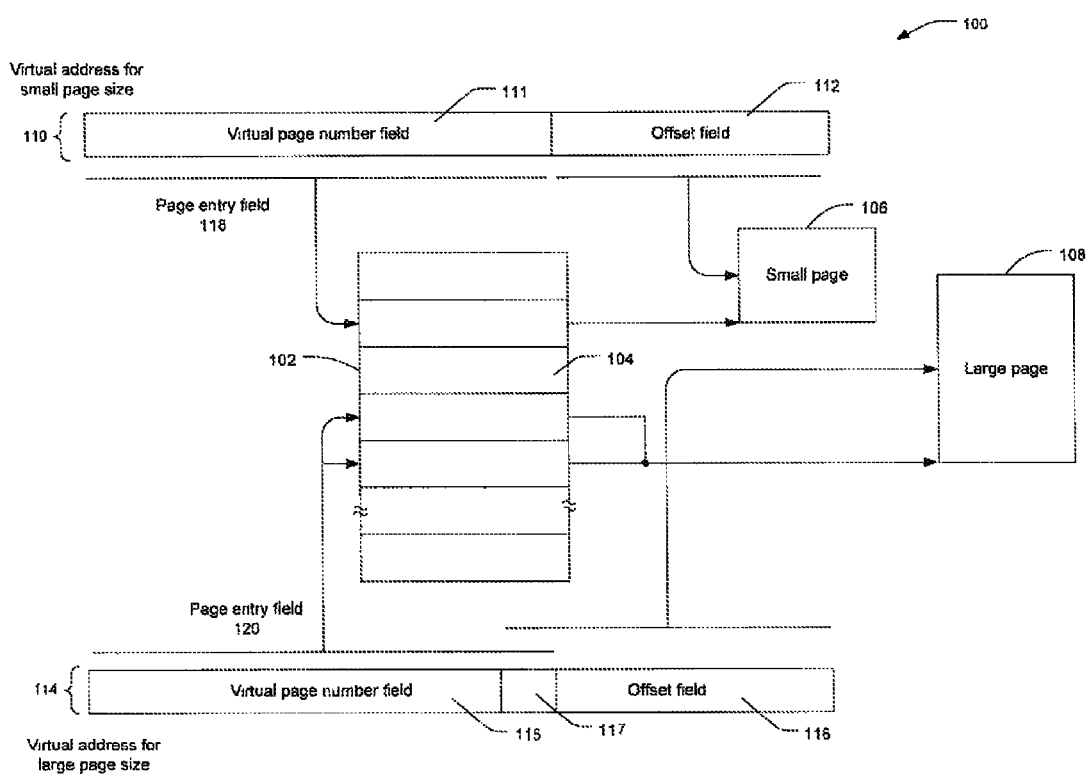
FIG. 1 illustrates a page table according to a prior approach.
Figure 2:
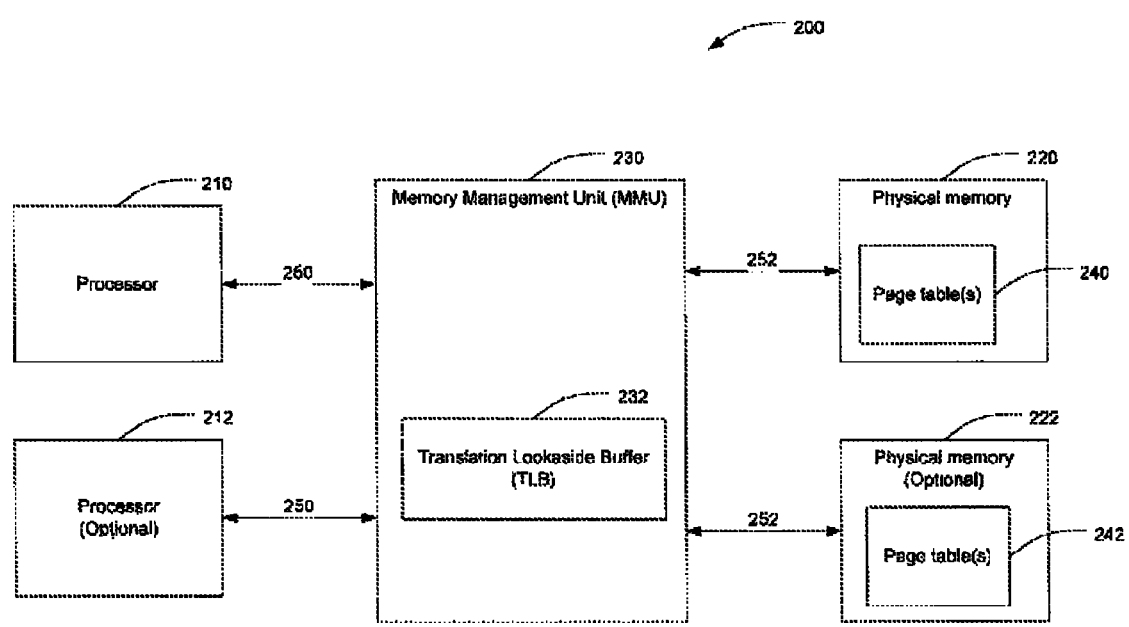
FIG. 2 illustrates an exemplary computing system in accordance with one embodiment.

Referring to FIG. 2, an exemplary computing system 200 that can be employed with various embodiments is illustrated. The system 200 includes a first processor 210, a memory management unit (MMU) 230 and a first physical memory 220. In accordance with the illustrated embodiment, the memory management unit 230 includes a translation lookaside buffer (TLB) 232 and the physical memory 220 stores at least one page table 240. In some embodiments, the system 200 also optionally includes a second processor 212 and/or a second physical memory 222 where the second physical memory 222 may also store a page table 242. In other embodiments, page tables 240, 242 are not stored in the physical memories 220, 222 but in another memory device (not shown), which may for example be included inside the memory management unit (MMU) 230. The illustrated components communicate with one another via one or more communication buses 250, 252. According to one embodiment, the communication buses 250, 252 are separate communication buses while in other embodiments the communication buses 250, 252 are provided in the form of a single common communication bus. According to each of the preceding embodiments, one of more additional processing components can be connected to the communication buses 250, 252.

Each of the first processor 210 and the second processor 212 can run one or more application programs that, for example, employ either or both of the physical memories 220, 222. Accordingly, the processors 210, 212 can send memory-related requests to the memory management unit 230 such as requests to allocate new memory resources, requests to access memory resources, and/or requests to release memory resources. A single processor 210, 212 can employ a single set of page tables or multiple sets of page tables. For example, where a processor executes multiple processes, each process may employ its own set of page tables. Where the system 200 includes multiple processors 210, 212, the processors can use the same set of page tables or each processor may have its own set of page tables. Where multiple page tables are employed, a region in the physical memory 220, 222 can be mapped in a single set of page tables or multiple sets of page tables.

According to one embodiment, the processor 210, 212 can be a central processing unit (CPU), a graphics processing unit (GPU), or another type of processor included in the system 200.

Depending on the embodiment, the first physical memory can include DRAM, FLASH, EEPROM, or other forms of RAM, ROM or other types of directly-addressable memory. Further, the page tables 240, 242 used by the memory management unit 230 can be stored in a single physical memory or multiple physical memories depending on the embodiment.

According to various embodiments, the memory management unit 230 is employed to handle access to memory (the first physical memory 220 and the second physical memory 222) as requested by one or more of the processors 210, 212. Operation of the memory management unit 230 includes virtual memory management such as translating virtual addresses employed by the processors 210, 212 to addresses in the physical memories 220, 222. In various embodiments the memory management unit 230 includes a hardware component that operates to translate virtual addresses to physical addresses in physical memory. According to other embodiments, the memory management unit 230 includes both hardware and software that operate to translate virtual addresses to physical addresses in physical memory.

In operation, the system 200 operates by communicating a request from the processor 210, 212 to the MMU 230 to allocate one or more blocks of memory in the physical memory 220, 222 to use in page tables 240, 242 that include a plurality of entries. The MMU 230 responds by allocating one or more blocks (for example, pages) of memory in the physical memory 220, 222 for one or more page sizes and corresponding entries for the page tables 240 and/or 242. According to some embodiments, the page sizes and entries are established based on an amount of memory requested by the processor. The amount of memory may, for example, be requested by the processor for execution of one or more application programs. In some embodiments, the MMU 230 allocates blocks of memory for a first page size and a second page size that is different than the first page size. In a further embodiment, the MMU 230 also allocates blocks of memory for a third page size and corresponding entries where the third page size is different than the first page size and the second page size.

According to the illustrated embodiment, the translation lookaside buffer 232 included in the MMU 230 provides a cache to store virtual-address-to-physical-address conversions that are frequently used or were used most recently. On receipt of a request access memory (for example, to read from or to write to memory), the MMU 230 first determines whether the virtual-address-to-physical-address conversion for the requested address is stored in the TLB 232. If the virtual-address-to-physical-address conversion is not found in the TLB 232 (referred to as a "TLB miss"), the MMU 230 converts the virtual address to a physical address by employing the first page table 240 and/or the second page table 242 stored in the physical memory 220, 222.

The MMU 230 locates an entry in the page table corresponding to the virtual address where the entry includes the physical address corresponding to the virtual address provided by the processor 210, 212. According to some embodiments, the MMU 230 then loads (i.e., copies) the entry to the TLB 232 for subsequent use. According to further embodiments, efficiency of the operation of the MMU 230 can be improved where the MMU 230 loads the TLB 232 with the entry and with neighboring entries in the page table. According to one embodiment, the TLB 232 includes a set of cache lines such that during a TLB load operation a number of consecutive entries in the page table are loaded within a TLB cache line. In a further embodiment, the number of consecutive entries in the page table that are loaded is established based on the capacity of a single TLB cache line. In some embodiments, the MMU 230 allows efficient loading operations from the page table to the translation lookaside buffer (TLB).

According to various embodiments, the MMU 230 releases blocks of memory that were previously allocated and removes the corresponding entries from page tables 240, 242 on receipt of a request to free memory resources by the processor 210, 212.

Further, the MMU 230 can also perform general maintenance on the page tables 240, 242 to reduce an amount of memory required to store the page tables. According to one example, the MMU 230 can reduce the size of a page table containing only entries for memory pages of the second size. The preceding approach also increases the efficiency of operation of the MMU 230 in processing generally because it reduces the amount of physical memory required to store the page tables. This results in a reduced amount of processing required to locate addresses in physical memory. A further improvement in efficiency can also be achieved in embodiments where the MMU 230 removes the page table when all entries in the page table mapped to one large contiguous block of memory in the physical memory.

Figure 3:
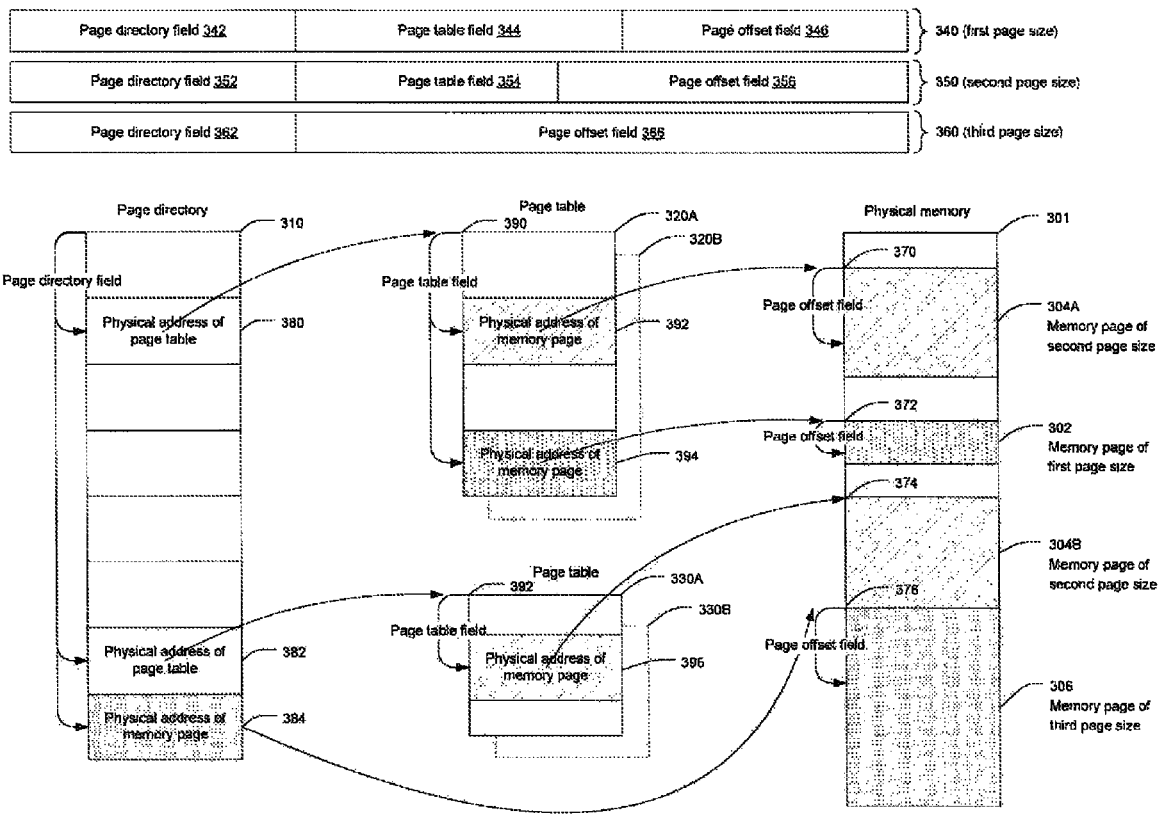
FIG. 3 illustrates an approach to memory management in accordance with one embodiment.

Referring now to FIG. 3, a block diagram of an approach to memory management is illustrated in accordance with various embodiments. The memory management approach references portions of a physical memory 301 using memory pages where each memory page has a virtual address in a virtual memory and a physical address in the physical memory 301. For example, in FIG. 3, a memory page 304A has a virtual address (not shown) and a physical address 370 in the physical memory 301, a memory page 302 has a virtual address (not shown) and a physical address 372 in the physical memory 301, a memory page 304B has a virtual address (not shown) and a physical address 374 in the physical memory 301 and a memory page 306 has a virtual address (not shown) and a physical address 376 in the physical memory.

The memory management approach converts the virtual address for a memory page into its corresponding physical address in the physical memory 301 using a plurality of page tables. According to the illustrated embodiment, the approach uses a plurality of page tables 310, 320A-320B and 330A-330B organized into two levels. The first level includes a page directory 310 and the second level includes a plurality of page tables 320A, 320B, 330A and 330B.

In the illustrated embodiment, the page directory 310 includes a plurality of entries, such as page directory entries 380, 382 and 384. In various embodiments, a page directory entry stores the physical address of a page table. The physical address stored in the page directory entry identifies one of the plurality of page tables 320A, 320B, 330A and 330B. For example, page directory entry 380 stores the physical address 390 of page table 320A and page directory entry 382 stores the physical address 392 of page table 330A. In some embodiments, a page directory entry can store the physical address of a memory page in the physical memory 301. For example, page directory entry 384 stores the physical address 376 of memory page 306 in the physical memory 301. In some embodiments, the page directory entry (for example, 380, 382 and 384) can include both a physical address and a tag (not shown). In some embodiments, the tag indicates whether the physical address included in the page directory entry is the physical address of a page table or the physical address of a memory page in the physical memory 301. As will be explained in greater detail herein, in some embodiments, the tag indicates whether the physical address included in the page directory entry is the physical address of a page table of a first type or a page table of a second type.

In the illustrated embodiment, each of the page tables includes a plurality of page table entries. For example, page table 320A includes page table entries 392 and 394. In the illustrated embodiment, a page table entry includes the physical address of a memory page in the physical memory 301. For example, page table entry 392 includes the physical address 370 of memory page 304A in the physical memory 301. In some embodiments, the page table entry includes both the physical address of a memory page and a tag (not shown) providing information on the referenced memory page. As explained in greater detail herein, in some embodiments, the tag provides information related to the size of the referenced memory page.

In some embodiments, the tag included in the page directory entry and/or the page table entry provides other information such as whether the referenced memory page is readable and/or writeable, or whether the referenced memory page has been recently accessed and/or modified. The tag can also indicate an error condition, for example, if the page directory entry or the page table entry does not include a physical address. In the case of a page directory entry, the tag can also identify the physical memory or type of physical memory addressed by the page directory entry (in the case of multiple physical memories or types of physical memories).

In various embodiments, the approach uses multiple levels of page tables to translate a virtual address to the physical address of the memory page in the physical memory. In the illustrated embodiment, the approach uses a plurality of page tables organized into two levels. In other embodiments, the approach uses a plurality of page tables organized into three or more levels of page tables. In this case, a page table in the lowest level (e.g., level 3 in the case of 3 levels) includes physical addresses of memory pages in the physical memory, while a page table in a higher level (e.g., level 1 or level 2) includes physical addresses of page tables in lower levels or, in some cases, physical addresses of memory pages in the physical memory.

In the illustrated embodiment, the physical memory 301 can be referenced using memory pages of a first page size and using memory pages of a second page size that is larger than the first page size. For example, in FIG. 3, the physical memory 301 includes a block of memory 302 referenced as a memory page of a first page size and two equally-sized larger blocks of memory 304A, 304B referenced as memory pages of a second page size that is larger than the first page size. Optionally, the physical memory 301 can be referenced using memory pages of a third page size that is larger than the first page size and the second page size. For example, in FIG. 3, the physical memory 301 includes a block of memory 306 referenced as a memory page of a third page size that is larger than the first page size and the second page size. In accordance with various embodiments, the physical memory 301 can be referenced using any combination of one or more of the first page size; the second page size; the third page size; or another page size.

As is described in more detail below, at least two formats of virtual addresses are employed to map the virtual memory to locations in the physical memory 301. For example, a first virtual address format 340 may be employed for memory pages of a first page size and a second virtual address format 350 may be employed for memory pages of a second page size. Optionally, a third virtual address format 360 may be employed for memory pages of a third page size. According to one embodiment, each of the first virtual address format 340, the second virtual address format 350 and a plurality of additional virtual address formats are employed. As described in more detail below, in general, the size of the virtual address (the number of bits included in the virtual address) is the same for the first virtual address format 340, second virtual address format 350 and third virtual address format 360 in a given configuration.

According to the illustrated embodiment, the first virtual address format 340 includes a page directory field 342, a page table field 344 and a page offset field 346; the second virtual address format 350 includes a page directory field 352, a page table field 354 and a page offset field 356; and the third virtual address format 360 includes a page directory field 362 and a page offset field 366 and does not include a page table field.

According to some embodiments, a virtual address is converted into a physical address according to the following steps. First, the portion of the virtual address corresponding to the page directory field 342, 352 or 362 is used to locate an entry in the page directory, such as page directory entry 380, 382, or 384. For a given configuration, the page directory fields 342, 352 and 362 are of the same size (include the same number of bits) for each virtual address format 340, 350, 360. As described previously, in the illustrated embodiment, a page directory entry includes either the physical address of a page table (e.g., page directory entry 380 or 382) or the physical address of a memory page (e.g., page directory entry 384). As described previously, in some embodiments, a tag in the page directory entry indicates whether the physical address is that of a page table or a memory page.

If the page directory entry includes the physical address of a page table, the physical address provides the start address the page table and the portion of the virtual address corresponding to the page table field 344 or 354 is used to locate an entry in the page table. The page table entry includes the physical address (start address) of the memory page in the physical memory 301. The portion of the virtual address corresponding to the page offset field 346 or 356 is used to locate a particular location (e.g., a particular byte) in the memory page in physical memory.

If the page directory entry includes the physical address of a memory page, the physical address provides the start address of the memory page and the portion of the virtual address corresponding to page offset field 360 is used to locate a particular location (e.g., a particular byte) in the memory page in physical memory.

According to the illustrated embodiment, the memory management approach includes at least one page table 320A of the first type and at least one page table 330A of the second type. According to the illustrated embodiment, the approach optionally includes a plurality of page tables of the first type (e.g., page tables 320A and 320B) and a plurality of page tables of the second type (e.g., page tables 330A and 330B).

According to an embodiment, page tables of the first type (e.g., page tables 320A and 320B) can include entries for memory pages of multiple page sizes. In the illustrated embodiment, page tables 320A, 320 B of the first type can include entries for memory pages of the first page size and entries for memory pages 304 of the second page size. For example, page table 320A of the first type includes a page table entry 392 that includes the physical address 370 of memory page 304A of the second page size and page table entry 394 that includes the physical address 372 of memory page 302 of the first page size. Accordingly, in various embodiments, page tables of the first type are organized and indexed in a manner such that the page table can be used to convert virtual addresses in the virtual address format 340 for memory pages of the first page size and can be used to convert virtual addresses in the virtual address format 350 for memory pages of the second page. In various embodiments, page tables of the first type are also organized such that, if all entries in the page table are for memory pages of the second page size, the size of the page table can be reduced, thereby freeing memory resources allocated for the page table. In some embodiments, page tables of the first type are organized and indexed in a manner that allows the size of the page table to be reduced while also allowing efficient loading operations from the page table to the translation lookaside buffer (TLB).

According to an embodiment, page tables of the second type (e.g., page tables 330A and 330B) can include entries for memory pages of a single page size. In the illustrated embodiment, page tables 330A, 330B of the second type can only include entries for memory pages 304 of the second page size. For example, page table 330A of the second type includes a page table entry 396 that includes the physical address 374 of memory page 304B of the second page size and does not include any entries for memory pages of the first page size. Accordingly, in various embodiments, page tables of the second type are organized and indexed in a manner such that the page table can be used to convert virtual addresses in the virtual address format 350 for memory pages of the second page.

As explained in greater detail herein, in some embodiments one or more of the first page table 320 are in a non-compressed form and one or more of the second page table 330 are in a compressed form. According to one embodiment, a tag in the page directory entry 380, 382 indicates whether the page directory entry includes the physical address of a page table of the first type (e.g., page directory entry 380) or the physical address of a page table of the second type (e.g., page directory entry 382). If the tag indicates a page table of the first type, the page table is indexed using an indexing method associated with page tables of the first type. If the tag indicates a page table of the second type, the page table is indexed using an indexing method associated with page tables of the second type.

According to various embodiments, the second page size is a multiple N of the first page size. According to some embodiments, the second page size is a multiple N of the first page size, where the multiple N is a power P of two: $N=(2^P)$. The following table illustrates the values of the multiple N, the first page size, and the second page size for different values of the power P, according to this embodiment and using an exemplary first page size of 4 Kbytes:

TABLE 1

| P | $N = (2^P)$ | First page size | Second page size |
|---|---|---|---|
| 1 | 2 | 4 Kbytes | 8 Kbytes |
| 2 | 4 | 4 Kbytes | 16 Kbytes |
| 3 | 8 | 4 Kbytes | 32 Kbytes |
| 4 | 16 | 4 Kbytes | 64 Kbytes |
| 5 | 32 | 4 Kbytes | 128 Kbytes |

According to some embodiments, the value of the multiple N is fixed (e.g., hardcoded). According to other embodiments, the value of the multiple N is variable from one configuration to another and may be selected during a configuration stage.

In some embodiments, the first virtual address format 340, the second virtual address format 350, and, optionally, the third virtual address format 360 are fixed. In some embodiments, the first virtual address format 340, the second virtual address format 350, and, optionally, the third virtual address format 360 are variable from one configuration to another and may be determined during a configuration stage. For example, the virtual address formats 340, 350, and 360 may be determined based on parameters such as the desired virtual address range, the desired physical address range, the first page size and the multiple N.

FIG. 8A illustrates a virtual address 840 having 40 bits denoted bits 39 through 0. FIGS. 8B through 8E illustrate the values of the multiple N, the second page size, and the virtual address formats for different values of the power P and using an exemplary first page size of 4 Kbytes and a virtual address 840 having 40 bits.

FIG. 8B illustrates a first virtual address format 840B (for a first page size), a second virtual address format 850B (for a second page size), and a third virtual address format 860B (for a third page size) for the case where P=1 and N=2. The first virtual address format 840B includes a page directory field of 17 bits, a page table field of 11 bits, and a page offset field of 12 bits. The second virtual address format 850B includes a page directory field of 17 bits, a page table field of 10 bits, and a page offset field of 13 bits. Since the second page size is N=2 times larger than the first page size, the page offset field in the second virtual address format 850B includes P=1 additional bits compared to the page offset field in the first virtual address format 840B. As a result, the page table field for the second virtual address format 850B includes P=1 fewer bits compared to the page table field in the first virtual address format 840B. The third virtual address format 860B includes a page directory field of 17 bits and a page offset field of 23 bits and does not include a page table field.

FIG. 8C illustrates a first virtual address format 840C (for a first page size), a second virtual address format 850C (for a second page size), and a third virtual address format 860C (for a third page size) for the case where P=2 and N=4. The first virtual address format 840C includes a page directory field of 16 bits, a page table field of 12 bits, and a page offset field of 12 bits. The second virtual address format 850C includes a page directory field of 16 bits, a page table field of 10 bits, and a page offset field of 14 bits. Since the second page size is N=4 times larger than the first page size, the page offset field in the second virtual address format 850C includes P=2 additional bits compared to the page offset field in the first virtual address format 840C. As a result, the page table field for the second virtual address format 850C includes P=2 fewer bits compared to the page table field in the first virtual address format 840C. The third virtual address format 860C includes a page directory field of 16 bits and a page offset field of 24 bits and does not include a page table field.

FIG. 8D illustrates a first virtual address format 840D (for a first page size), a second virtual address format 850D (for a second page size), and a third virtual address format 860D (for a third page size) for the case where P=3 and N=8. Since the second page size is N=8 times larger than the first page size, the page offset field in the second virtual address format 850D includes P=3 additional bits compared to the page offset field in the first virtual address format 840D. As a result, the page table field for the second virtual address format 850D includes P=3 fewer bits compared to the page table field in the first virtual address format 840D.

FIG. 8E illustrates a first virtual address format 840E (for a first page size), a second virtual address format 850E (for a second page size), and a third virtual address format 860E (for a third page size) for the case where P=4 and N=16. Since the second page size is N=16 times larger than the first page size, the page offset field in the second virtual address format 850E includes P=4 additional bits compared to the page offset field in the first virtual address format 840E. As a result, the page table field for the second virtual address format 850E includes P=4 fewer bits compared to the page table field in the first virtual address format 840E.

Figure 4:
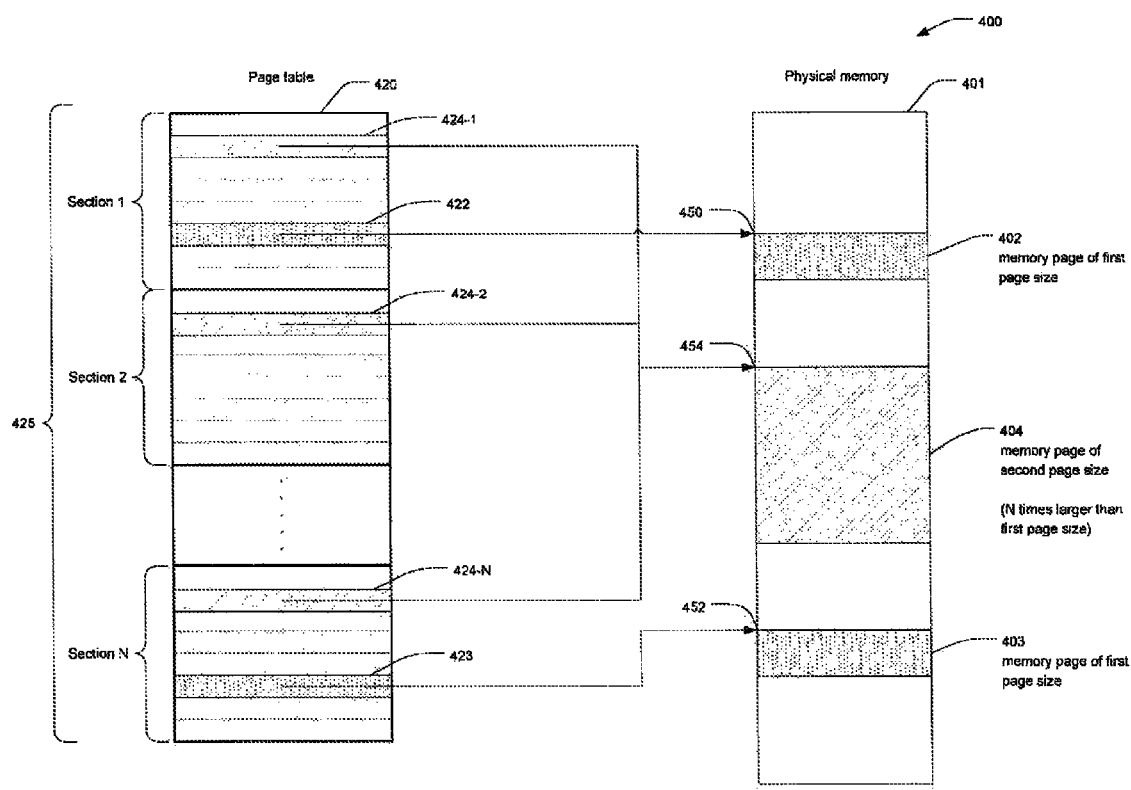
FIG. 4 illustrates a page table organization in accordance with one embodiment.

Referring now to FIG. 4, a page table 420 and a physical memory 401 are illustrated in accordance with one embodiment. In general, the page table 420 is employed to translate virtual addresses to physical addresses in the physical memory 401. In various embodiments, the page table 420 may be employed in a memory management approach including multiple levels of page tables. For example, the page table 420 may be employed in the memory management approach illustrated in FIG. 3. For example, the page table 420 may be included as one of the page tables 320A, 320B of the first type described with reference to FIG. 3.

In the illustrated embodiment, the physical memory 401 includes portions of memory referenced as memory pages 402, 403 having a first page size and a portion of memory referenced as a memory page 404 having a second page size that is larger than the first page size. In various embodiments, the physical memory 401 can include one of each page size, a plurality of each page size or one of either the first page size (for example, memory pages 402, 403) or the second page size (for example, memory page 404) and, possibly, one or a plurality of other page sizes. In some embodiments, the page table 420 can also be employed for three or more page sizes.

In the illustrated embodiment, the page table 420 includes a first entry 422 that provides the physical address 450 of the first memory page 402, a second entry 423 that provides the physical address 452 of the second memory page 403 and a plurality of duplicate entries 424 (1-N) that each provide the physical address 454 of the third memory page 404. The duplicate entries 424 (1-N) are included for the third memory page 404 because the page table 420 is configured for the first page size which is smaller than the second page size of the third memory page 404. Consequently, multiple entries are employed for each memory page having the second page size. Generally, a single entry is employed for each memory page of the first page size.

In various embodiments described herein, the page table 420 is organized and the plurality of duplicate entries 424 (1-N) are located in the page table 420 to allow for more efficient memory allocation. These embodiments can overcome the deficiencies of the prior approaches by allowing the size of the page table 420 to be reduced if all entries in page table 401 are for memory pages of the second page size.

According to some embodiments, the page table 420 is organized into a plurality of sections 425, for example, Section (1)-Section (N) where each of the sections 425 includes a plurality of entries. In general, the inclusion of the plurality of sections 425 provides an improved page table structure because it provides a reference by which the duplicate entries 424 (1-N) for memory pages having the second page size are located at known and repeatable locations in the page table 420. As is described herein, reconfiguration of the page table 420 (for example, a reduction in a size of the page table 420) is more easily accomplished with the duplicate entries 424 (1-N) for anyone page located in the page table 420 in the organized and non-adjacent fashion illustrated in FIG. 4.

According to some embodiments, the quantity of Sections (N) included in the plurality of sections 425 of the page table 420 is established based on a size ratio between the pages of the first page size (for example, 402, 403) and the pages of the second page size 404. According to some embodiments, where the second page size is N times larger than the first page size, the page table is divided into a number N of sections. For example, where the second page size is N=2 times larger than the first page size (for example, 4 kB and 8 kB), the page table 420 is divided into N=2 sections. If the second page size is N=4 times larger than the first page size (for example, 4 kB and 16 kB), the page table 420 is divided into N=4 sections. If the second page size is N=8 times larger than the first page size (for example, 4 kB and 32 kB), the page table 420 is divided into N=8 sections. Thus, embodiments provide a scalable approach to organizing the page table 420 into a plurality of sections 425 (1-N).

In the example of FIG. 4, one duplicate of the plurality of entries 424 (1-N) for the third page 404 is included in each section. Further, each of the plurality of entries 424 (1-N) for the third page 404 is included as Entry 2 in the respective section 425 (1-N). In various embodiments, duplicate entries for a memory page of the second page size are included at corresponding locations in each of the sections.

According to various embodiments, the organization of page table 420 allows the size of the page table to be reduced if the page table 420 includes only entries for memory pages of the second page size. In the illustrated embodiment, if the page table 420 includes only entries for memory pages of the second page size, sections 2 through N contain only duplicate entries and therefore can be removed. The resulting page table contains only section 1. For example, the resulting page table may be included as one of the page tables 330A, 330B of the second type described with reference to FIG. 3.

Referring again to FIG. 3, the virtual address 350 for the second page size 304 includes a smaller page table field 354 than the page table field 344 included in the virtual address 340 for the first page size 302. In other words, the virtual address for multiple page memory structure requires at least two types of virtual addresses. According to some embodiments, the page table organization described with reference to FIG. 4 is implemented using the virtual address structure and page table indexing illustrated in FIG. 5.

Figure 5:
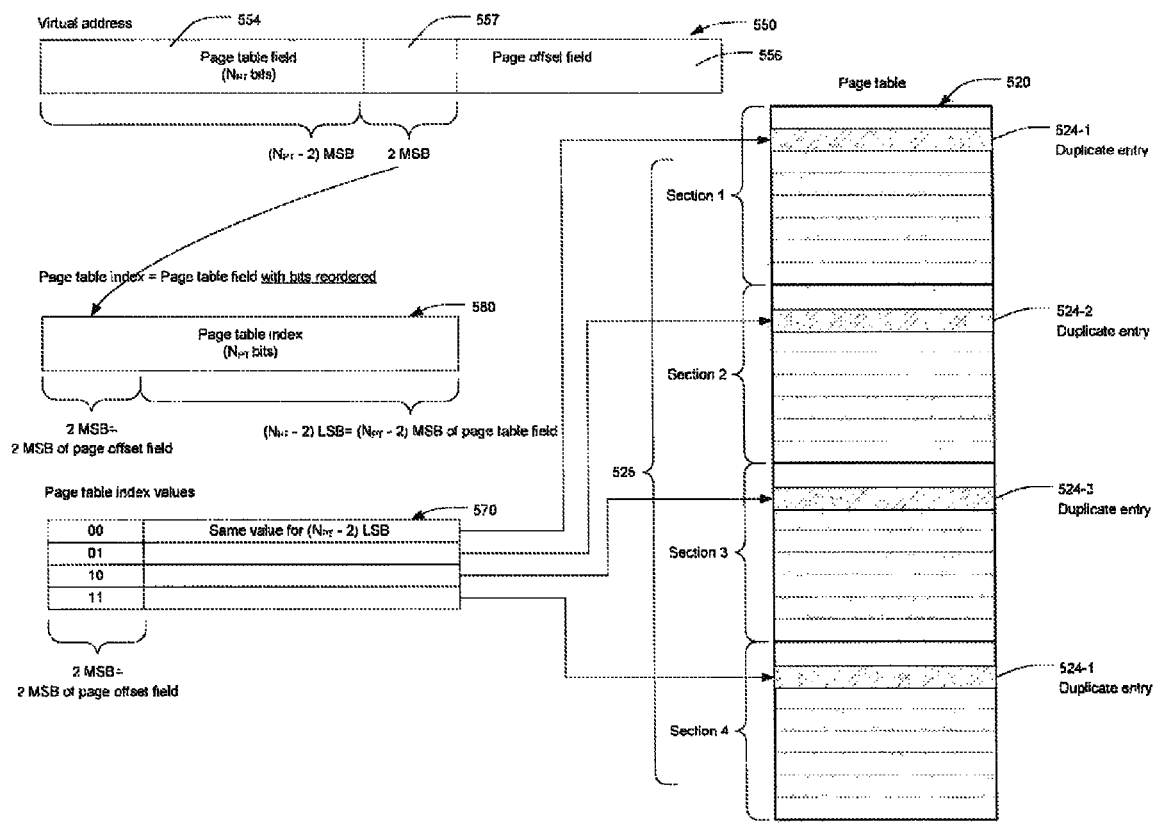
FIG. 5 illustrates an approach to indexing locations in a page table in accordance with the embodiment of FIG. 4.

Referring to FIG. 5, a page table 520, a virtual address 550 and a page table index 580 are illustrated in accordance with some embodiments. The page table 520 is configured for the physical memory that includes multiple page sizes, a first page size and a second page size where the second page size is larger than the first page size. Further, the page table 520 is organized into a plurality of sections 525. In the illustrated embodiment, the second page size is four times larger than the first page size and N=4. Thus, there are a total of four sections in the plurality of sections. Each of the plurality of sections 525 includes a plurality of entries, respectively.

The virtual address 550 illustrates an address format used for translating addresses in the virtual memory to addresses for memory pages of the second page size in the physical memory. The virtual address 550 includes page table field 554 and the page offset field 556 including at least one bit 557 that is added to the page offset field 556. In the illustrated embodiment, the at least one bit 557 includes two bits which are located as the most significant bits of the page offset field 556. The at least one bit 557 is employed in combination with the data in the page table field 554 to identify the entry in the page table that includes the physical address of the memory page in the physical memory (for example, the address of memory page 304 in the memory 301).

According to some embodiments, a page table index 580 is created for entries in the page table 520 by locating the at least one bit 557 as the most significant bit or bits of the page table index 580 in combination with the bits included in the page table field 554. Thus, page table index 580 includes bits that are included in the virtual address 550 in a new sequence. This reordering of bits from the virtual address creates an index of the N duplicate entries (for example, the entries 524-1, 524-2, 524-3, 524-4 in the illustrated embodiment) where each entry is located at the same location within their respective section (1-N) of the plurality of sections 525. In this embodiment, the entries 524-1, 524-2, 524-3, 524-4 are each located as a second entry in Section 1 to Section 4, respectively.

According to the illustrated embodiment, the (N) page table index values 570 for a single page of the second page size are distributed in the manner illustrated in the page table 520 because the two most significant bits of the page table increment by one bit beginning with the index value for Section 1. This is in contrast to prior approaches where direct indexing is employed because those prior approaches result in duplicate entries appearing consecutively in the page table. Further, the approach described with reference to FIGS. 4 and 5 is scalable for use with any quantity of 2-N Sections.

The same indexing approach can be used for locating entries in the page table 520 for memory pages of the first page size. In this case, the at least one bit 557 represents the least significant bit(s) of the page table field and there is no overlap with the page offset field. Therefore, for memory pages of the first page size, corresponding entries in different sections of the page table can include different physical addresses; no duplicate entries are required.

Returning to FIG. 4, as described previously, if the page table 420 includes only entries for memory pages of the second page size, the size of the page table 420 can be reduced by retaining only one of the sections (e.g., Section 1) and removing the remaining sections (e.g., sections 2 through N). As described previously, the resulting page table may be included as one of the page tables 330A, 330B of the second type described with reference to FIG. 3.

The resulting page table (e.g., of the second type) contains only entries for memory pages of the second page size and therefore converts only virtual addresses in the second virtual address format (e.g., 350 in FIG. 3). The resulting page table (e.g., of the second type) can be indexed directly using the portion of the virtual address corresponding to the page table field 354 in the second virtual address format 350. More precisely, the page table index can be made equal to the portion of the virtual address corresponding to the page table field 354 in the second virtual address format without any reordering of bits. In the example of FIG. 5, the new page table index does not include the two most significant bits identifying a section and does not use the two most significant bits 557 of the page offset field 556.

Figure 6:
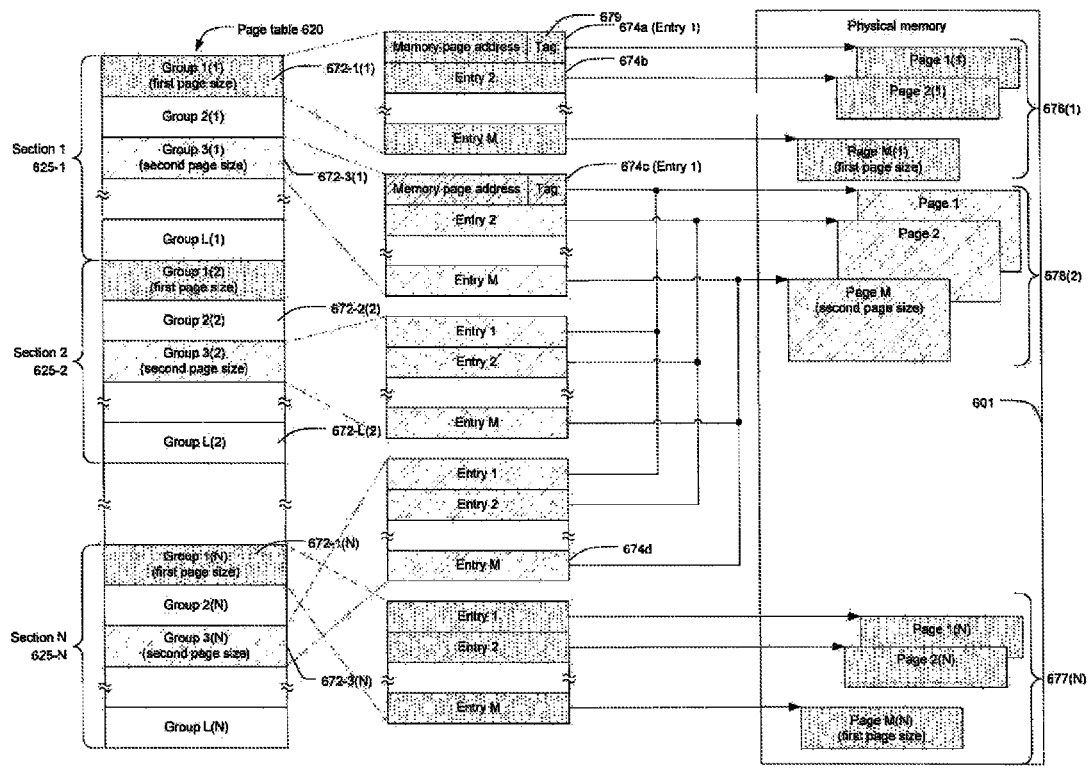
FIG. 6 illustrates a page table organization in accordance with another embodiment.

Referring now to FIG. 6, a page table 620 and a physical memory 601 are illustrated in accordance with another embodiment. In general, the page table 620 is employed to translate virtual addresses to physical addresses in the physical memory 601. In various embodiments, the page table 620 may be employed in a memory management approach including multiple levels of page tables. For example, the page table 620 may be employed in the memory management approach illustrated in FIG. 3. For example, the page table 620 may be included as one of the page tables 320A, 320B of the first type described with reference to FIG. 3.

In the illustrated embodiment, the physical memory 601 includes portions of memory referenced as memory pages having a first page size, such as Page 1(1) to Page M(1) and Page 1(N) to Page M(N), and portions of memory referenced as memory pages having a second page size that is larger than the first page size such as Page 1 to Page M. The page table 620 includes a plurality of sections and also includes a plurality of groups within each section. According to these embodiments, all entries within a group are for memory pages of the same page size (for example, a group includes only entries for memory pages of the first page size or only entries for memory pages of the second page size). Further, in these embodiments, each group includes a plurality of consecutive entries within a section of the page table. In some embodiments, the page table organization illustrated in FIG. 6 can be employed to improve use of memory resources by allowing the size of the page table to be reduced where all entries in the page table are for memory pages having the second page size. In some embodiments, the page table organization illustrated in FIG. 6 can also be employed to make improved use of a translation lookaside buffer (TLB) by allowing a group of consecutive entries to be loaded from the page table into the TLB.

According to the embodiment in FIG. 6, a page table 620 includes a plurality of sections 625 (1-N) where each of the sections 625 includes a plurality of groups 672. According to this embodiment, each group 672 is established for pages having the same page size. In addition, each group 672 includes a plurality of entries 674, for example, Entries 1-M where each of the entries provides a physical address of a memory page in the physical memory 601. According to various embodiments, the number of Entries 1-M in a group is determined based on the size of a cache line in the translation lookaside buffer (TLB). In some embodiments, the number of entries in a group is made equal to the maximum number of entries that can fit into a cache line of the TLB. For example, if the TLB cache line is of 128 bytes and each entry in the page table is of 4 bytes, 32 entries are included in each group of the page table. In the illustrated embodiment, groups of pages of the same size are indexed together, for example, a first plurality of pages 676(1) having the first page size, a second plurality of pages 677(N) having the first page size and a third plurality of pages 678(2) having the second page size. Each of the groups includes the same quantity of entries (M).

In the illustrated embodiment, each of the plurality of sections 625 includes the same number of groups. Further, in the illustrated embodiment, groups are organized identically such that a first group all for the same page size (for example, Group 1 (1), Group 1 (2), Group 1 (3) . . . Group 1 (N)) is located at the same location in each of the sections.

The illustrated embodiment organizes a page table into a plurality of sections of the same size, where each of the sections includes the same quantity of a plurality of groups where the groups are organized to index the same quantity of pages of physical memory using the same quantity of entries in each group. Thus, Entry 1 of the group 672-1(1) indexes page 1(1) of the plurality of pages 676(1), Entry 1 of the group 672-1(N) indexes page 1(1) of the plurality of pages 677(N), and Entry 1 of the group 672-3(1) indexes page 1(1) of the plurality of pages 678(N). In some embodiments, each of the page table entries 674 includes both the physical address of a memory page and a tag 679 providing information on the referenced memory page. In some embodiments, the tag provides information related to the size of the referenced memory page, such as whether the referenced memory page is of the first page size or the second page size.

According to various embodiments, the organization of page table 620 allows the size of the page table 620 to be reduced if the page table 620 includes only entries for memory pages of the second page size. In the illustrated embodiment, if the page table 620 includes only entries for memory pages of the second page size, sections 2 through N contain only duplicate entries and therefore can be removed. The resulting page table contains only section 1. For example, the resulting page table may be included as one of the page tables 330A, 330B of the second type described with reference to FIG. 3.

Figure 7:
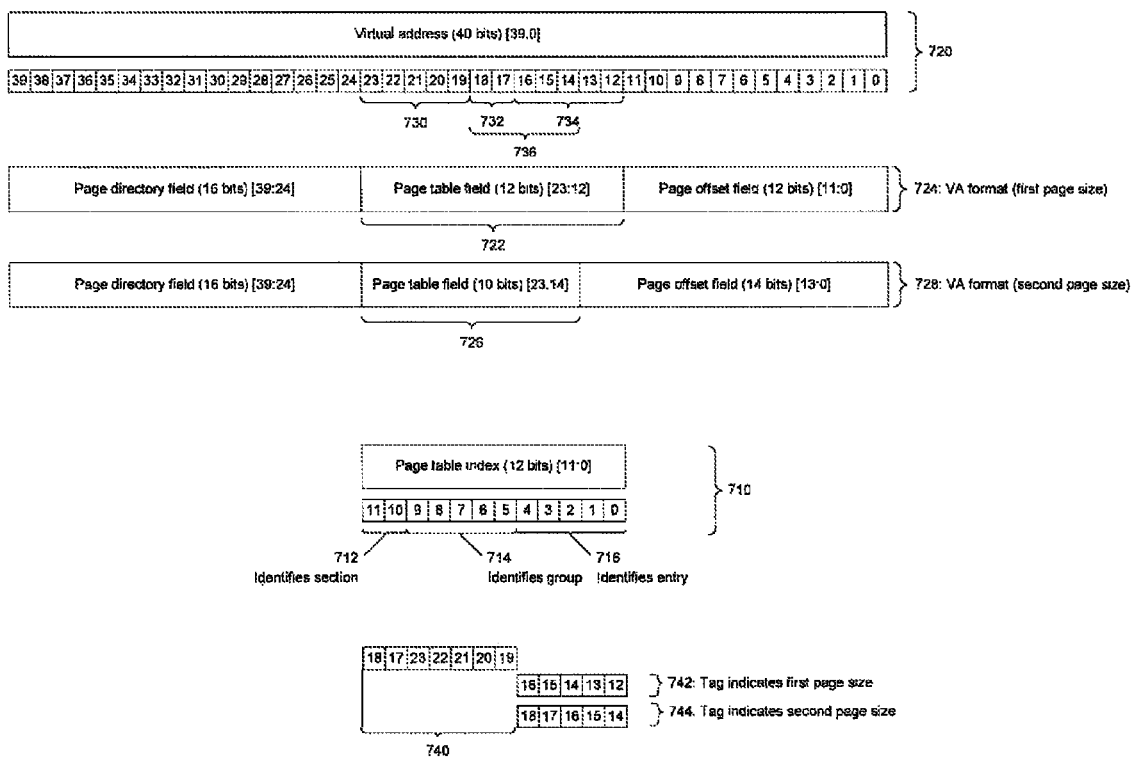
FIG. 7 illustrates an approach to indexing locations in a page table in accordance with the embodiment of FIG. 6.

Referring now to FIG. 7, an approach to indexing entries in a page table that is organized into sections and groups is described. FIG. 7 illustrates, in accordance with one embodiment, a process for determining a page table index 710 from a virtual address 720 for the page table organization described with reference to FIG. 6. The page table index 710 is employed by the memory management unit to identify the correct entry in the page table. In general, the process for determining the correct entry includes employing selected bits included in the virtual address 720 to create the page table index 710. In the illustrated embodiment, the indexing approach employs two specific approaches: a first approach for indexing entries for memory pages having the first page size; and a second approach for indexing entries for memory pages having the second page size. As explained below, other approaches may be used depending on the embodiment.

For ease of explanation, FIG. 7 refers to the parameter values and virtual address formats illustrated in FIG. 8C where P=2 and N=4. However, the general approach illustrated in FIG. 7 can be employed for any of the virtual address formats illustrated in FIGS. 8B-8E and for other virtual address formats. Further, the general approach illustrated in FIG. 7 can be employed with virtual addresses having a size larger or smaller than the 40-bit virtual address illustrated in FIG. 8A.

Referring to the top of FIG. 7, a virtual address 720 includes a total of 40 bits identified as bits 39 through 0. In the illustrated embodiment, a virtual address format 724 for pages having a first page size includes a 16 bit page directory field, a 12 bit page table field 722 and a 12 bit page offset field. Further, a virtual address format 728 for pages having a second page size includes a 16 bit page directory field, a 10 bit page table field 726 and a 14 bit page offset field. Bits 23 through 19 of the virtual address 720 (identified together as 730) are identified as corresponding to the most significant bits of the page table field 722 in the virtual address format 724 and/or the page table field 726 in the virtual address format 728. Bits 18 through 17 (identified together as 732) are identified as corresponding to a quantity P of the next most significant bits page table field 722 and/or page table field 726. Bits 16 through 12 (identified together as 734) are identified as corresponding to the least significant bits of the page table field 722 in the virtual address format 724. Finally, bits 18 through 14 (identified together as 736) are identified as corresponding to the least significant bits of the page table field 726 in the virtual address format 728.

Referring to the bottom half of FIG. 7, the page table index 710 includes 12 bits identified as bits 11 through 0, respectively, where bit 11 represents the most significant bit of the page table index and bit 0 represents the least significant bit. The page table index 710 can include fewer or more than 12 bits depending on the embodiment.

In the illustrated embodiment, multiple fields are included in the page table index 710. According to this embodiment, the page table index 710 includes a first field 712, a second field 714, and a third field 716. In further embodiments, the page table index 710 can include fields having different sizes (either larger or smaller) than those illustrated in FIG. 7. In general, the first field 712 identifies a section, the second field 714 identifies a group and a third field 716 identifies an entry.

For example, where the second page size is (N=2^P) times larger than the first page size, the first field 712 includes a quantity of P bits and identifies a section among the N sections. In the illustrated embodiment, the first field 712 includes the most significant bits of the page table index 710. Further, in the example of FIG. 7, the first field 712 includes P=2 bits (bits 11 and 10 of the page table index) which identify one section among the N=4 sections.

According to the illustrated embodiment, the second field 714 includes the middle bits of the page table index 710 and identifies a group among the L groups in a section. In the example of FIG. 7 where a section has L=32 groups, the second field 714 includes 5 bits (bits 9 through 5) and identifies one group among the L=32 groups.

The third field 716 includes the least significant bits of the page table index 710 and identifies an entry among the M entries in a group. In the example of FIG. 7 where a group includes M=32 entries, the third field 716 includes 5 bits (bits 4 through 0) and identifies one entry among the M=32 entries.

In the illustrated example, a page table index having values of "0" for field 712, "0" for field 714, and "0" for field 716 identifies the page table entry 674a located at (section 1, group 1, entry 1). As another example, a page table index having decimal values of "0" for field 712, "2" for field 714, and "0" for field 716 identifies the page table entry 674c (Entry 1) located at (section 1, group 3, entry 1). For another example, decimal values of "3" for field 712, "2" for field 714, and "31" for field 716 identifies a page table entry 674d (Entry M) located at (section N=4, group 3, entry M=32).

Because the page table index can include more than one format depending on the number of page sizes employed in the physical memory, the value included in the page table index 710 is also identified as a value 740 of the first field 712 and second field 714 together. In addition and as explained below, the portion of the page table index excluding the value 740 can provide either a first value 742 where the virtual address is for a page having the first page size or a second value 744 were the virtual address is for a page having the second page size.

According to one embodiment, the page table index 710 is determined from the virtual address 720 (the virtual address to be converted into a physical address) according to the following steps. First, the value 740 is determined as the value provided by the values of the first field 712 and the second field 714 of the page table index 710.

As illustrated in FIG. 7, the value of the second field 714 of the page table index 710 (identifying a group) is made equal to the portion 730 of the virtual address 720 corresponding to the most significant bits of the page table fields 722, 726 (bits 23 through 19 of the virtual address 720). The preceding approach is employed with the page table index 710 for a page having the first page size or a page having the second page size. In the illustrated example, where field 714 includes 5 bits to identify L=32 groups in a section, the value of the field 714 is made equal to the 5 most significant bits of the portion of the virtual address 720 corresponding to the page table fields 722 and 726.

The value of the first field 712 (identifying a section) which, for a second page size that is (N=2^P) times larger than the first page size, contains P bits is made equal to the next P bits 732 in the portion of the virtual address 720 corresponding to the page table fields 722 and 726. In this example where P=2, the value of bits 11 and 10 of the page table index 710 are made equal to bits 18 and 17, respectively, of the virtual address 720. Further, in this example, the bits 18 and 17 identify a section among the sections (1-N) in the page table.

The value 740 of the first field and second field are used to index a specific group within a specific section in the page table 620 of FIG. 6, for example to index group 1 of section 1 or group 3 of section 1. The indexed group is then loaded (i.e., copied) to the Translation look-aside buffer (TLB), for example, by the memory management unit.

Then, an entry among the entries of the indexed group is accessed. As described above, these entries can include a tag to indicate whether the entry is for a memory page of the first page size or the second page size. In the illustrated embodiment, the value of the tag is read to determine the page size associated with the entry. Because all entries in a group are for memory pages of the same size, any entry in the group (for example, the first entry) can be accessed to determine whether the group is for memory pages of the first page size or second page size.

If the tag indicates the group is for memory pages of the first page size (e.g., the tag for entry 674a of FIG. 6), the value of the third field 716 of the page table index 710 is made equal to the value of the portion 734 of the virtual address 720 corresponding to the least significant bits of the page table field 722 in the virtual address format 724 for the first page size. In this example, where the number of entries in a group is M=32, the value of bits 4 through 0 of the page table index 710 are made equal to the value of bits 16 through 12 of the virtual address 720 (shown at 742) for entries associated with a page having the first page size.

If the tag indicates the group is for memory pages of the second page size (e.g. tag for entry 674c of FIG. 6), the value of the third field 716 of the page table index 710 is made equal to the portion 736 of the virtual address 720 corresponding to the least significant bits of the page table field 726 in the virtual address format 728 of the second page size. In this example, where the number of entries in a group is M=32, the value of bits 4 through 0 of the page table index 710 are made equal to the values of bits 18 through 14 of the virtual address 720 (shown at 744) for entries associated with a page having the second page size.

Returning to FIG. 6, as described previously, if the page table 620 includes only entries for memory pages of the second page size, the size of the page table 620 can be reduced by retaining only one of the sections (e.g., Section 1) and removing the remaining sections (e.g., sections 2 through N). As described previously, the resulting page table may be included as one of the page tables 330A, 330B of the second type described with reference to FIG. 3.

The resulting page table (e.g., of the second type) contains only entries for memory pages of the second page size and therefore converts only virtual addresses in the second virtual address format 728. The resulting page table (e.g., of the second type) can be indexed directly using the portion of the virtual address 720 corresponding to the page table field 726 in the second virtual address format 728. More precisely, the page table index can be made equal to the portion of the virtual address 720 corresponding to the page table field 726 without any reordering of bits. In the example of FIG. 7, the new page table index includes 10 bits (denoted bits 9 through 0) that are made equal to bits 23 through 14, respectively, of the virtual address 720 corresponding to the 10-bit page table field 726 (without any reordering of bits). The new page table index does not include a field indicating a section.

Although illustrated as a combination of specialized hardware and software, various aspects of the system 200 such as the memory management unit can be implemented as specialized software executing in a general purpose computing device such as a PC, a laptop, a tablet computer or other handheld computing device. The computing device can include, for example, a processor connected to one or memory devices, such as a disk drive, flash drive, memory or other device for storing data. Depending on the embodiment, the computing device can communicate over hardwired or wireless communication interfaces with one or more other devices including, for example, the host system. Accordingly, any of the embodiments described herein can include a non-transitory computer readable medium in which signals are stored that when executed by a processing system implementing aspects described herein.

Further, aspects can be implemented with a specially-programmed, special purpose hardware, for example, an application-specific integrated circuit (ASIC). Aspects of the invention can be implemented in software, hardware or firmware or any combination thereof. Such methods, acts, apparatus, systems, system elements and components thereof may be implemented as part of the computing system described above or as an independent component or components.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

What is claimed is:

1. A method of memory management to support memory pages having a plurality of page sizes including a first page size and a second page size, where the second page size is a multiple (N) of the first page size, the method comprising:
provide a page table divided into a plurality of (N) sections, where the plurality of (N) sections are equally sized with each of the sections including an equal quantity of a plurality of locations identifiable relative to a starting location of the respective section;
for a page having the first page size, providing a single entry in the page table, wherein the single entry includes a starting address of the page having the first page size;
for a page having the second page size, providing a plurality of entries in the page table, wherein the plurality of entries includes an entry at the same location in each of the sections, wherein each of the plurality of entries includes a starting address of the page having the second page size; and
if the page table does not include an entry for a page of the first page size, reducing a size of the page table by eliminating at least one of the sections.

2. The method of claim 1, further comprising employing a page table index to identify the plurality of (N) sections and the plurality of locations.

3. The method of claim 2, further comprising, for each of the plurality of entries, indexing a location of the plurality of entries, respectively, by reordering at least one bit that is employed in each of a page table field and a page offset field.

4. The method of claim 3, further comprising, for each of the plurality of entries, employing at least one bit from the page offset field as a most significant bit of the page table index.

5. The method of claim 1, further comprising:
identifying a first plurality of consecutive entries included in a first section of the plurality of (N) sections as a first group for entries including starting addresses of pages having the first page size, the first plurality of consecutive entries located at a first location in the first section; and
identifying a second plurality of consecutive entries included in the first section of the plurality of (N) sections as a second group for entries including starting addresses of pages having the second page size, the second plurality of consecutive entries located at a second location in the first section.

6. The method of claim 5, further comprising storing a virtual-address-to-physical-address conversion for each of the first plurality of consecutive entries in a translation lookaside buffer (TLB) when a translation for at least one of the plurality of consecutive entries is not located in the TLB.

7. The method of claim 1, wherein the page table is included in a plurality of page tables, wherein the method further comprises:
   determining, for each page table included in the plurality of page tables, respectively, whether the respective page table is storing addresses only for pages having the second page size;
   if the respective page table is storing addresses only for pages having the second page size, employing only one section selected from the plurality of sections originally included in the respective page table;
   employing a page directory to identify an address of a page table associated with a virtual address; and
   including in the page directory an indication of whether the page table associated with the virtual address is reduced in size because the page table associated with the virtual address is storing addresses only for pages having the second page size.

8. The method of claim 1, further comprising:
   employing a virtual address format that includes a page directory field, a page table field and a page offset field;
   defining a length of the page table field by including a first plurality of bits in the page table field and defining a length of the page offset field by including a second plurality of bits in the page offset field, each bit included in the first plurality of bits different than each bit included in the second plurality bits;
   for pages of the first size, indexing locations in the page table using a first address determined using the first plurality of bits without using any bit included in the second plurality of bits;
   for pages of the second size, indexing locations in the page table using a second address determined using the first plurality of bits and at least one bit included in the second plurality of bits, the at least one bit being a most significant bit of the page offset field; and
   employing the at least one bit as the most significant bit of the second address.

9. A memory management system, comprising:
   a physical memory referenced using at least one page having a first page size and at least one page having a second page size, where the second page size is a multiple (N) of the first page size; and
   a memory management unit configured to identify locations in the physical memory by translating virtual memory addresses to physical memory addresses using a page table,
   wherein the memory management unit configured to divide the page table into a plurality of (N) sections,
   wherein the memory management unit is configured to, for a page having the first page size, provide a single entry in the page table, wherein the single entry includes a starting address of the page having the first page size,
   wherein the memory management unit is configured to, for a page having the second page size, provide a plurality of entries in the page table, wherein the plurality of entries includes an entry at the same location in each of the sections, wherein each of the plurality of entries includes a starting address of the page having the second page size, and
   wherein the memory management unit is configured to reduce a size of the page table by eliminating at least one of the sections if the page table does not include an entry for the page having the first page size.

10. The system of claim 9, wherein the memory management unit is configurable for a plurality of values of (N).

11. The system of claim 10, wherein the memory management unit is configured to establish the second page size based on the first page size and a value of (N) selected from the plurality of values of (N).

12. The system of claim 9, wherein the memory management unit is configurable for a plurality of virtual address formats including a first virtual address format for the page having a first page size and a second virtual address format for the page having the second page size.

13. The system of claim 12, wherein the memory management unit indexes the page having the second page size, at least in part, by reordering at least one bit in the second address format.

14. The system of claim 9, wherein the memory management unit is configured to identify a plurality of consecutive entries included in a first section of the plurality of (N) sections as a first group for entries including starting addresses of pages having the same page size.

15. The system of claim 14, further comprising at least one translation lookaside buffer (TLB), wherein the memory management unit is configured to store a virtual-address-to-physical-address translation for each of the first plurality of consecutive entries in the TLB when a translation for at least one of the plurality of consecutive entries is not located in the TLB.

16. The system of claim 9, further comprising at least one processor coupled to the memory management unit, wherein the memory management unit configures the physical memory for a plurality of page tables in response to a request from the at least one processor.

* * * * *